United States Patent [19]

Kendall

[11] Patent Number: 5,632,518
[45] Date of Patent: May 27, 1997

[54] REAR IMPACT TRAILER GUARD

[75] Inventor: Donald H. Kendall, Almont, Mich.

[73] Assignee: The United States of America as represented by the Secretary of the Army, Washington, D.C.

[21] Appl. No.: 636,991

[22] Filed: Apr. 15, 1996

[51] Int. Cl.⁶ .................................................... B60R 19/56
[52] U.S. Cl. ............................................ 293/103; 293/118
[58] Field of Search ................................ 293/102, 103, 293/118, 119, 133, 142

[56] References Cited

U.S. PATENT DOCUMENTS 3,871,695  3/1975  Koenig ........................... 293/118
4,026,590  5/1977  Holm ............................. 293/118
5,507,546  4/1996  Holley ........................ 293/102 X

*Primary Examiner*—Dennis H. Pedder
*Attorney, Agent, or Firm*—Peter A. Taucher; Gail S. Soderling

[57] ABSTRACT

An auxiliary protection device is attached to the rear of a semitrailer which resists the tendency of passenger vehicles to go under a trailer upon impact in order to provide an increased measure of safety. In addition, the device to will absorb energy incrementally so as to minimize vehicle damage at low speeds but have sufficient energy absorption to safely prevent incursion at moderate speeds. The device can be moved to a retracted position to allow the trailer to back up a ramp or into a plane with the protection device retracted so as to avoid injury to the ramp.

1 Claim, 3 Drawing Sheets

REAR IMPACT TRAILER GUARD

GOVERNMENT INTEREST

The invention described herein may be manufactured, used and licensed by or for the Government for governmental purposes without payment to me of any royalty.

BACKGROUND OF THE INVENTION

1. Field of the Invention

In one aspect this invention relates to semitrailer construction. In yet a further aspect this invention relates to safety guards used to minimize injuries in rear impacts where a smaller vehicle impacts a semitrailer.

2. Prior Art

The rear of semitrailers is located at an elevated level when compared to the front of normal passenger vehicles. While cars are required to have a standard bumper located within set guidelines to minimize the damage caused when cars collide, large trucks do not presently have such a standard. Thus when a car impacts the rear of a semitrailer, the car tends to continue under the trailer frame. Some have called the present structure a moving guillotine because of the tendency of passenger vehicles to go under the trailer frame and injure the vehicle's occupants even at relatively low speeds. Remedial regulation has been proposed.

It would be desirable to have an auxiliary protection device attached to the rear of a semitrailer which would resist the tendency of passenger vehicles to go under a trailer upon impact in order to provide an increased measure of safety. In addition it would be desirable for the device to absorb energy incrementally so as to minimize vehicle damage at low speeds but have sufficient energy absorption to safely prevent incursion at moderate speeds. Certain military type trailers have additional conditions which must be met. Military vehicles are air lifted to positions near their ultimate destination. The loading ramps for military cargo planes are very steep and if a semi-trailer having an auxiliary bumper is backed up the ramp the auxiliary bumper will probably interfere with the ramp causing damage to the bumper and or the loading ramp. Because military deployment is frequently done under severe time constraints, it would be even more desirable to have a safety bumper system which will move to a noninterfering position upon contact with a ramp but remain deployed when contacted with the shock force of a rear end collision.

BRIEF SUMMARY OF THE INVENTION

The present invention discloses a truck semitrailer safety bumper for use with semitrailers which have a frame supporting a trailer body. The device is designed to provide additional crash protection to cars and similar smaller vehicles when they impact the trailer during an accident but can be moved to a position to allow the semi-trailer to be backed up a steep ramp without interference.

The present invention has a bumper which extends horizontally substantially across the semitrailer body. The bumper is of sufficient strength to withstand the force of impact generated by the incursion of a passenger vehicle into the rear of the semitrailer.

A plurality of vertical bumper supports, located at spaced intervals across the width of the semitrailer are rotatably attached to the rear of the trailer at one end with the body of the vertical support extending downward toward the road surface. The second end of the vertical support is mounted to the bumper; the vertical supports serve to support and maintain the bumper about 20–22 inches above the road surface under normal conditions.

A plurality of multi-pieced collapsible struts have one end affixed to the semitrailer frame and the other end attached to the bumper. The collapsible struts are formed with a joint in the mid portion which allows the bumper to move inward toward the tires of the semitrailer and the collapsible strut to move toward the frame to move the bumper from an interfering position with regard to a ramp when the trailer is backed onto a cargo plane or up a steep ramp.

DETAILED DESCRIPTION OF PREFERRED EMBODIMENTS

Figure 1:
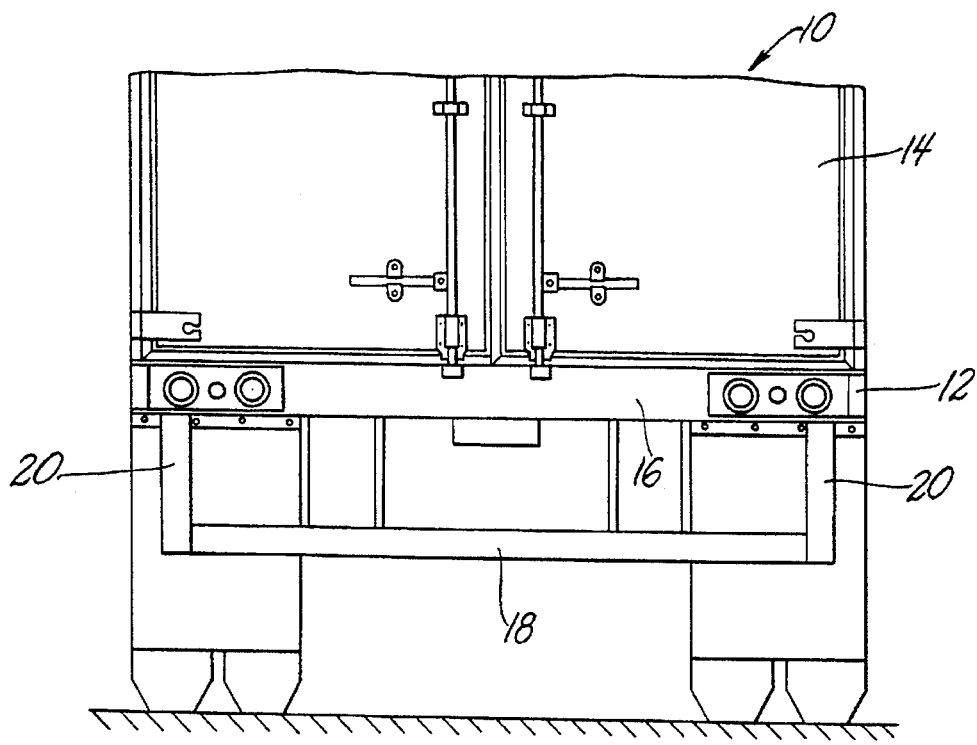
FIG. 1 is a rear view of a semi-trailer with a structure according to this invention.

Referring to the accompanying drawing and initially to FIG. 1, a structure according to the present invention is shown on a truck semitrailer designated generally 10. The trailer 10 has a frame 12 supporting a trailer body 14 in the conventional fashion. It is the rear frame member 16 which represents a danger when there is a rear impact accident of the truck by another vehicle as the hood of most cars fits under the rear frame member 16 and the car will submarine under the frame until the passenger compartment contacts the frame or the front hits the tires. By this time passengers in the front seat are very close to the truck and may be injured.

A safety bumper or impact guard bar 18 extends horizontally across the trailer 10 for a substantial portion of the total width. The bumper 18 will provide additional crash protection to cars and similar smaller vehicles when they impact the trailer during an accident. The bumper 18 will be of sufficient strength to withstand the force of most impacts generated by the incursion of a passenger vehicle into the rear of the semitrailer at normal crash speeds. Of course there are extreme conditions which would over come any advantage of the bumper.

The bumper 18 is suspended from the frame 12 below the rear frame member 16 by a plurality of vertical bumper supports 20 located at spaced intervals across the width of the semitrailer two supports being shown for example. The number of supports 20 required would be within the skill of the art, at least two, one on each end of the bumper 18 being the minimum. The vertical bumper supports 20 have one end rotatably attached to the trailer frame using pins 22 engaging the frame member 16. The vertical supports 20 extend downward toward the road surface and terminate at a second end located about 20–22" from the road surface 24. The second end of the vertical support is mounted to the bumper the vertical supports serving to support and maintain the bumper about 22 inches above the road surface 24 under normal conditions. The bumper 18 is located about 20–22" off the road surface since this will keep a vehicle from submarining under the truck frame 12 during an accident.

Figure 2:
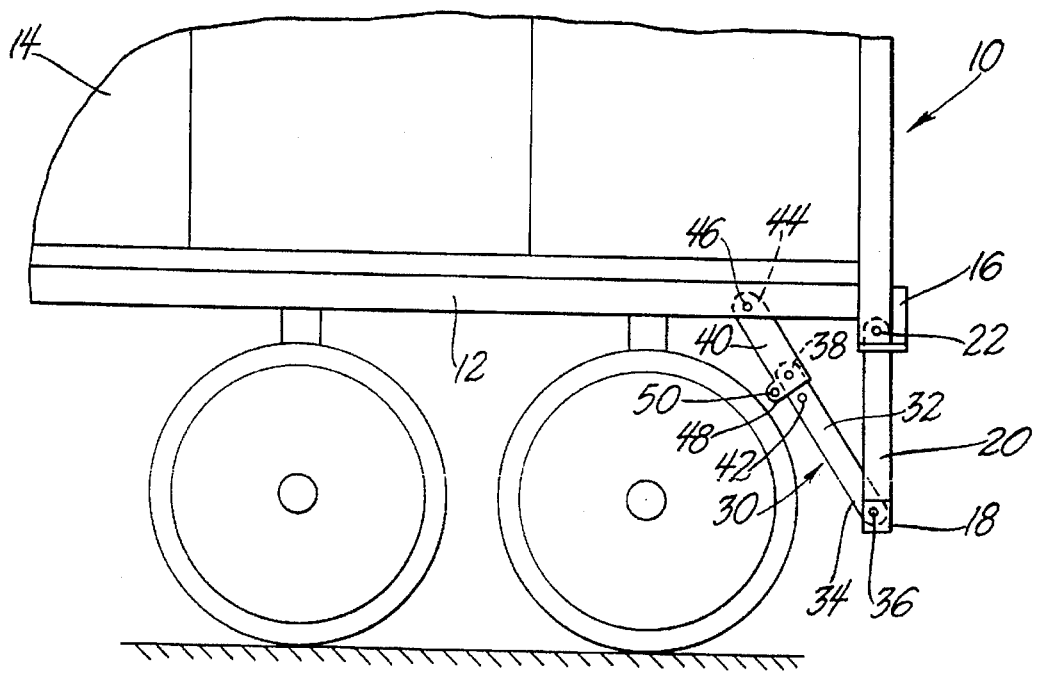
FIG. 2 is a side view of one embodiment of this invention with the bumper in the lowered position.
Figure 3:
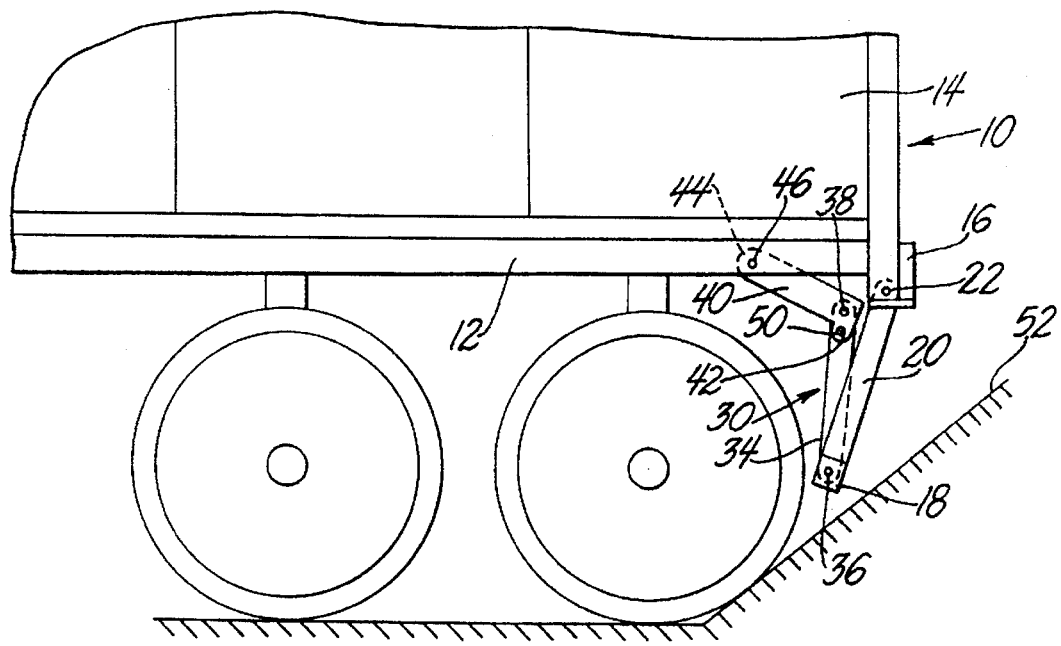
FIG. 3 is a side view of the structure of FIG. 2 with the bumper in a retracted position.

The bumper 18 and vertical struts 20 are held in position by a multi-pieced member which can be adjusted to move the bumper inward to allow the trailer 10 to be backed up a ramp. One example of a multi-pieced member useful in the practice of this invention is shown in FIGS. 2 and 3. In these figures the multi-pieced member is designated generally 30 and has two distinct positions the first or deployed position being shown in FIG. 2 and the second or loading position being shown in FIG. 3. The multi-pieced member 30 has a first bumper bar 32 which has its first, terminal end 34 rotatably attached to the bumper 18 by means of a pin 36 and a second end 38 rotatably fastened to a second frame bar 40. The first bumper bar 32 has an aperture 42 formed near the attachment point for use in securing the multi-pieced member 30 in the traveling position as will be described later. The frame bar 40 has a frame end 44 rotatably attached to semi-trailer frame 12 by means of a pin 46. The frame bar 40 has a boss 48 projecting from the edge of the bar opposite the vertical support 20. The boss 48 has a locking pin 50 disposed therein which retains the multi-pieced bar 30 in an extended position show in FIG. 2 to hold the bumper 18 in a normal operating position.

When it is necessary to load the semi-trailer in a plane or otherwise back it up a steep ramp pin 50 is removed and the multi-pieced bar 30 folded towards the rear of the taller 14 as shown in FIG. 3. The locking pin 50 is replaced in the boss 48 passing through aperture 42 which will hold the multipieced member bar 30 in the bent retracted position shown in FIG. 3. In this position, the bumper 18 is raised and retracted which avoids damage to the bumper 18 or cargo ramp 52. This structure is passive in nature and requires that the multipieced bar 30 be moved manually.

Figure 4:
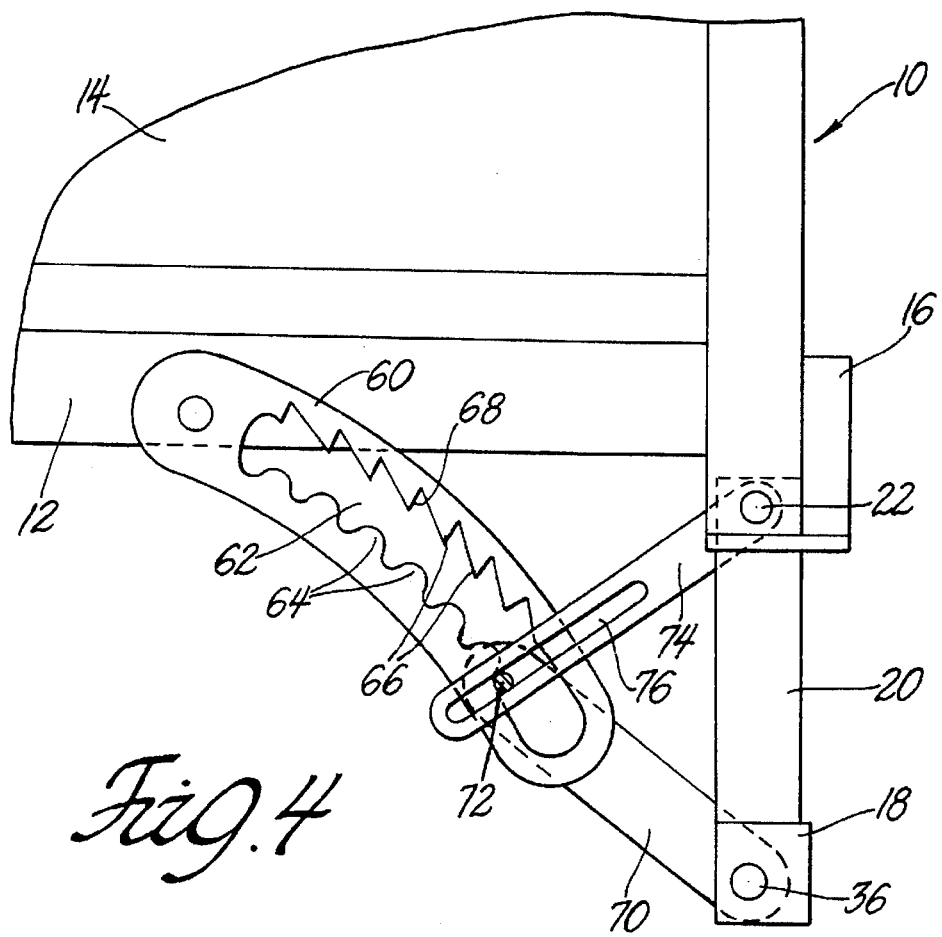
FIG. 4 is another embodiment of the invention with the bumper in lowered position.
Figure 5:
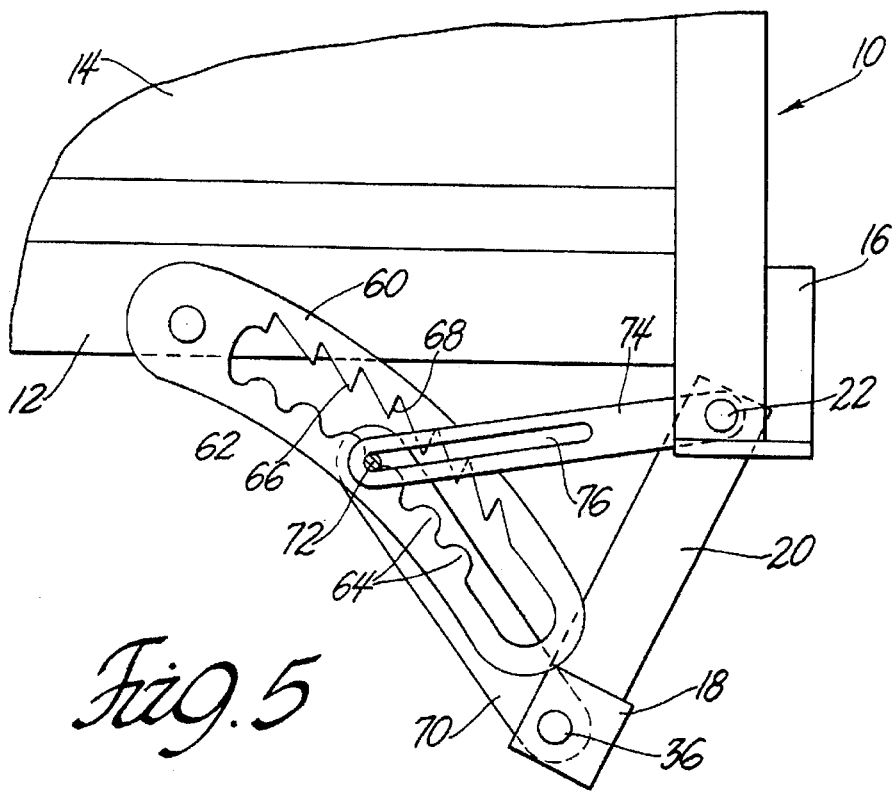
FIG. 5 is a view of the structure of FIG. 4 with the bumper in the retracted position caused by a gentle force applied to the bumper.
Figure 6:
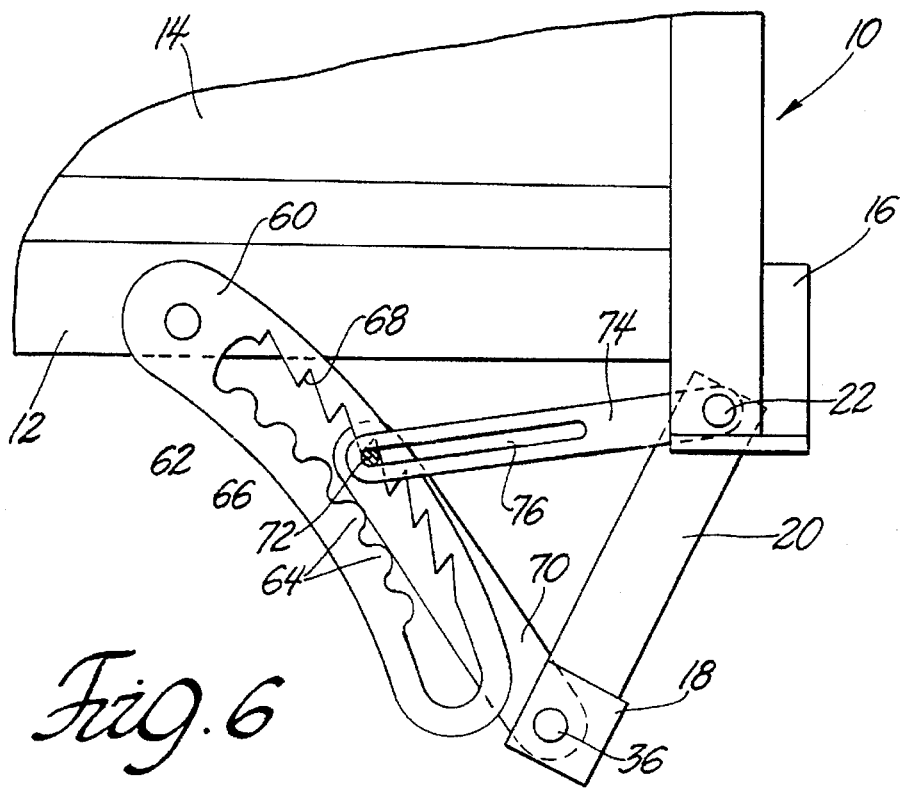
FIG. 6 is a view of the structure of FIG. 4 with the bumper in the retracted position caused by a shock force applied to the bumper.

A second, active embodiment of the present invention is shown in FIGS. 4, 5, and 6. Turning initially to FIG. 4, the bumper 18 is again shown suspended from the frame 12 below the rear frame member 16 by a plurality of vertical bumper supports 20 located at spaced intervals across the width of the semitrailer. One end of the vertical bumper supports 20 is rotatably attached to the trailer frame using the pins 22 which engage the frame member 16. The vertical supports 20 extending downward toward the road surface and terminates at a second end located about 20–22" from the road surface 24 with the second end of the vertical support being mounted to the bumper 18. The vertical supports 20 serve to support and maintain the bumper 18 as described above. The structure of FIG. 4 has a curved leg 60 extending backward and downward from the frame 12. The curved leg 60 has a curved opening 62 formed along the axis of the leg and extending along a substantial portion of the leg the curved opening being coaxially aligned with the leg. The curved opening 62 has a plurality of rounded or roller teeth 64 located on the lower edge of the curved opening. On the upper, opposite side of the curved opening 60 are a number of detents 66 the detents having a flat rearward facing surface 68. A first mobile arm 70 has one end rotatably mounted to the vertical support 20 by pin 36 so the arm can rotate about the pin 36. The other end of arm 70 has a transversely mounted bar 72 which extends through the curved opening formed in arm 70. The arm 70 lies below the curved arm 60 as shown in the drawing the cam pin 72 extending vertically to the plane of the drawing and towards the viewer. The end of the cam pin 72 nearest the viewer is supported by a slotted arm 74 rotatably mounted to the frame member 16 by the pin 22 the slotted arm being free to rotate in response to a force exerted by the cam pin 72.

FIGS. 5 and 6 show the results of two different types of force on the bumper 18 and the different response elicited by each type of force. In FIG. 5 the bumper 18 has met a slowly acting force such as might be encountered by the bumper contacting the ramp 52 as the trailer is backed up the ramp. The cam pin 72 has been moved slowly over the roller teeth 64 and resides in one of the depressions between the roller teeth. The depression is sufficiently deep to retain the cam pin 72 and hold the bumper 18 in the retracted position against gravity. However, once the trailer 10 begins to move and bounce on the road the cam pin 72 will tend to return to the lower end of the curved opening 62 redeploying the bumper 18 at its lowered position.

FIG. 6 shows the effect of a shock or rapid force such as might be caused by a vehicle impacting the bumper 18. In this instance the shock has caused the cam pin 72 to jump upward towards the teeth 66 and the cam pin 72 has engaged one of the tooth faces 68. This stops the bumper 18 from moving towards the trailer and locking the bumper from further movement until the trailer moves forward or the impacting vehicle retreats and the tooth is disengaged. Upon impact, cam pin 72 moves longitudinally in the slotted bar 74 the end of cam pin 72 being retained within slot 76.

Various modifications and alterations will become apparent to those skilled in the art with out departing from the scope and spirit of this invention and it is understood that this invention is not limited to the illustrative embodiments set forth above.

What is claimed is:

1. An improved truck semitrailer safety bumper for use with trailers having a frame supporting a trailer body, to provide additional crash protection to cars and similar smaller vehicles on rear impacts with the trailer including:

a safety bumper extending horizontally across the vehicle body, the safety bumper being of sufficient strength to withstand the force of impact generated by the impact of a vehicle;

a plurality of vertically extending bumper supports located at the rear of the trailer, the bumper supports having a first end rotatably attached to the trailer frame, and a second end mounted to the safety bumper, said vertically extending bumper supports maintaining the bumper about 20–22 inches above the road surface under normal conditions;

a plurality of curved legs having one end firmly attached to the trailer frame, and the other end extending towards the rear of the trailer to a point below the trailer frame, the curved legs having a curved aperture formed therethrough, the curved aperture having a plurality of roller teeth formed on the lower surface thereof and a plurality of detents formed on the upper surface thereof;

a plurality of second arm members corresponding in number to the vertical supports each of the second arm members being associated with a particular curved arm, one end of the second arm member being attached to the safety bumper and a second end extending towards the associated curved arm;

a plurality of slotted bars having one end attached to the trailer frame at a point near the rear of the trailer, the slotted bars having a longitudinal slot formed near the end of the slotted bar juxtaposed the curved arm, the slot being coaxially aligned with the slotted bar, and having an unattached end near the curved arm, the slotted bar being disposed on the side of the curved arm opposite the corresponding second arm member;

a plurality of cam pins associated with the second arms, said cam pins having one end firmly mounted in the second end of the second arm, each of the cam pins extending orthogonally to the associated second arm through the curved slot and into the slot in said slotted bar, whereby a gentle force on the safety bumper will cause the cam pin to move along the roller teeth allowing the bumper to retract in toward the trailer frame but when the bumper is struck forcefully, the cam pins will move into contact with one of the detents from the impact force preventing the vehicle from submarining under the semi-trailer.

\* \* \* \* \*